(12) United States Patent
Ur et al.

(10) Patent No.: US 10,079,743 B2
(45) Date of Patent: Sep. 18, 2018

(54) COMPUTING DEVICE PERFORMANCE MONITOR

(71) Applicant: EMPIRE TECHNOLOGY DEVELOPMENT LLC, Wilmington, DE (US)

(72) Inventors: Shmuel Ur, Galil (IL); Mordehai Margalit, Zichron Yaaqov (IL); Benjamin Maytal, Mevasseret-Zion (IL); Vlad Grigore Dabija, Mountain View, CA (US); Noam Meir, Herzlia (IL)

(73) Assignee: Empire Technology Development LLC, Wilmington, DE (US)

( * ) Notice: Subject to any disclaimer, the term of this patent is extended or adjusted under 35 U.S.C. 154(b) by 459 days.

(21) Appl. No.: 14/008,377

(22) PCT Filed: May 6, 2013

(86) PCT No.: PCT/US2013/039641
§ 371 (c)(1),
(2) Date: Sep. 27, 2013

(87) PCT Pub. No.: WO2014/182275
PCT Pub. Date: Nov. 13, 2014

(65) Prior Publication Data
US 2014/0330958 A1 Nov. 6, 2014

(51) Int. Cl.
*H04L 12/26* (2006.01)
*G06F 11/34* (2006.01)
(Continued)

(52) U.S. Cl.
CPC ...... *H04L 43/0876* (2013.01); *G06F 11/0709* (2013.01); *G06F 11/3409* (2013.01);
(Continued)

(58) Field of Classification Search
CPC .. H04L 43/0876; H04L 41/06; G06F 11/0709; G06F 11/3409; G06F 11/076;
(Continued)

(56) References Cited

U.S. PATENT DOCUMENTS 5,047,919 A * 9/1991 Sterling ............... G06F 11/3612
714/47.3
5,361,362 A 11/1994 Benkeser et al.
(Continued)

FOREIGN PATENT DOCUMENTS

| TW | I365630 B | 6/2012 |
| TW | I372527 B | 9/2012 |
| WO | 1992011589 A1 | 7/1992 |

OTHER PUBLICATIONS

Du, J. et al., "Performance Profiling in a Virtualized Environment," Proceedings HotCloud, pp. 6 (2010).
(Continued)

*Primary Examiner* — Chris Parry
*Assistant Examiner* — Soe M Hlaing

(57) ABSTRACT

Technologies are generally described for systems, devices and methods effective to monitor performance of a computing device. A computing device may receive a specified counting rate. The computing device may count at the specified counting rate to generate a sequence of counting numbers. The computing device may identify a first output of a process, such as results from computations performed on data, and may identify a first counting number when the first output is identified. The computing device may identify a second output of the process, such as additional results from the computations, and may identify a second counting number when the second output is identified. The computing device may then determine whether an alert should be generated based on the first and second counting numbers
(Continued)

such as when a difference between the first and second counting numbers exceeds a threshold value.

18 Claims, 7 Drawing Sheets

(51) Int. Cl.
*G06F 11/07* (2006.01)
*H04L 12/24* (2006.01)

(52) U.S. Cl.
CPC ........ *G06F 11/076* (2013.01); *G06F 11/3495* (2013.01); *G06F 2201/81* (2013.01); *G06F 2201/88* (2013.01); *H04L 41/06* (2013.01)

(58) Field of Classification Search
CPC ............. G06F 2201/81; G06F 11/3495; G06F 2201/88
See application file for complete search history.

(56) References Cited

U.S. PATENT DOCUMENTS

| | | | | |
|---|---|---|---|---|
| 5,781,703 | A * | 7/1998 | Desai | G06F 11/3495 706/50 |
| 6,480,966 | B1 | 11/2002 | Rawson | |
| 8,571,468 | B2 | 10/2013 | Hart | |
| 8,611,814 | B2 | 12/2013 | Hart | |
| 2004/0064290 | A1* | 4/2004 | Cabral | G06F 11/348 702/182 |
| 2005/0097228 | A1* | 5/2005 | Flautner | G06F 1/3203 710/1 |
| 2006/0212263 | A1* | 9/2006 | Koehler | G06F 11/3409 702/182 |
| 2008/0027961 | A1* | 1/2008 | Arlitt | G06F 11/3452 |
| 2010/0172292 | A1 | 7/2010 | Ramachandran et al. | |
| 2010/0251160 | A1 | 9/2010 | Shafi et al. | |
| 2011/0161524 | A1 | 6/2011 | Na et al. | |

OTHER PUBLICATIONS

Gupta, V. et al., "Evaluating Scalability of Multi-threaded Applications on a Many-core Platform," Technical Report, Georgia Institute of Technology, pp. 6 (2012).

Metz, C., "Google Spans Entire Planet With GPS-Powered Database," accessed at: http://web.archive.org/web/20130406132358/http://www.wired.com/wiredenterprise/2012/09/google-spanner/all, pp. 1-5 (Sep. 19, 2012).

Measuring Software Based IEEE 1588/PTP Slave Accuracy, Symmetricom, 2010, 10 pages.

A Comparison of PTP Software Slave Accuracy, Precision and Effectiveness, Symmetricom, 2011, 6 pages.

Data Center Fabric with Nanosecond Accuracy—Use IEEE1588 PTP on Nexus 3000 Switches March, White Paper Cisco, 2012, 13 pages.

Baldoni, R. et al., Coupling-Based Internal Clock Synchronization for Large Scale Dynamic Distributed Systems, Parallel and Distributed Systems, IEEE Transactions on, May 2010, p. 1-13, vol. 21, Issue 5.

Chauhan, J. et al., Is Doing Clock Synchronization in a VM a Good Idea?, Proc. of IPCCC, 2011, 8 pages.

"Application Response Measurement", Wikipedia, Sep. 2012, retrieved from www.wikipedia.org, 4 pages.

"Synchronization with IEEE 1588 PTP. Terasync. Part 3", Articles Alley, retrieved from http://www.articlesalley.com/article.detail.php/277206/104/GPS/Communications/11/Synchronization_with_IEEE_1588_PTP._Terasync._Part_3, on Oct. 11, 2013, 2 pages.

Taufer, M. and T. Stricker, A Performance Monitor based on Virtual Global Time for Clusters of PCs, Proceedings of the IEEE International Conference on Cluster Computing, 2003, p. 1-9.

"Application Response Measurement", Wikipedia, Mar. 2013, retrieved from www.wikipedia.org, 4 pages.

International Search Report and Written Opinion for application with application No. PCT/US13/39641, dated Jul. 16, 2013, 67 pages.

* cited by examiner

300 A computer program product.

302 A signal bearing medium.

304

At least one of

One or more instructions for receiving a specified counting rate at the computing device; or One or more instructions for counting, at the computing device, at the specified counting rate to generate a sequence of counting numbers; or One or more instructions for identifying a first output of a process at the computing device; or One or more instructions for identifying a first counting number when the first output is identified at the computing device; or One or more instructions for identifying a second output of the process at the computing device; or One or more instructions for identifying a second counting number when the second output is identified at the computing device; or One or more instructions for determining whether an alert should be generated based on the first and second counting numbers at the computing device.

| 306 A computer readable medium | 308 A recordable medium | 310 A communications medium |

Fig. 6

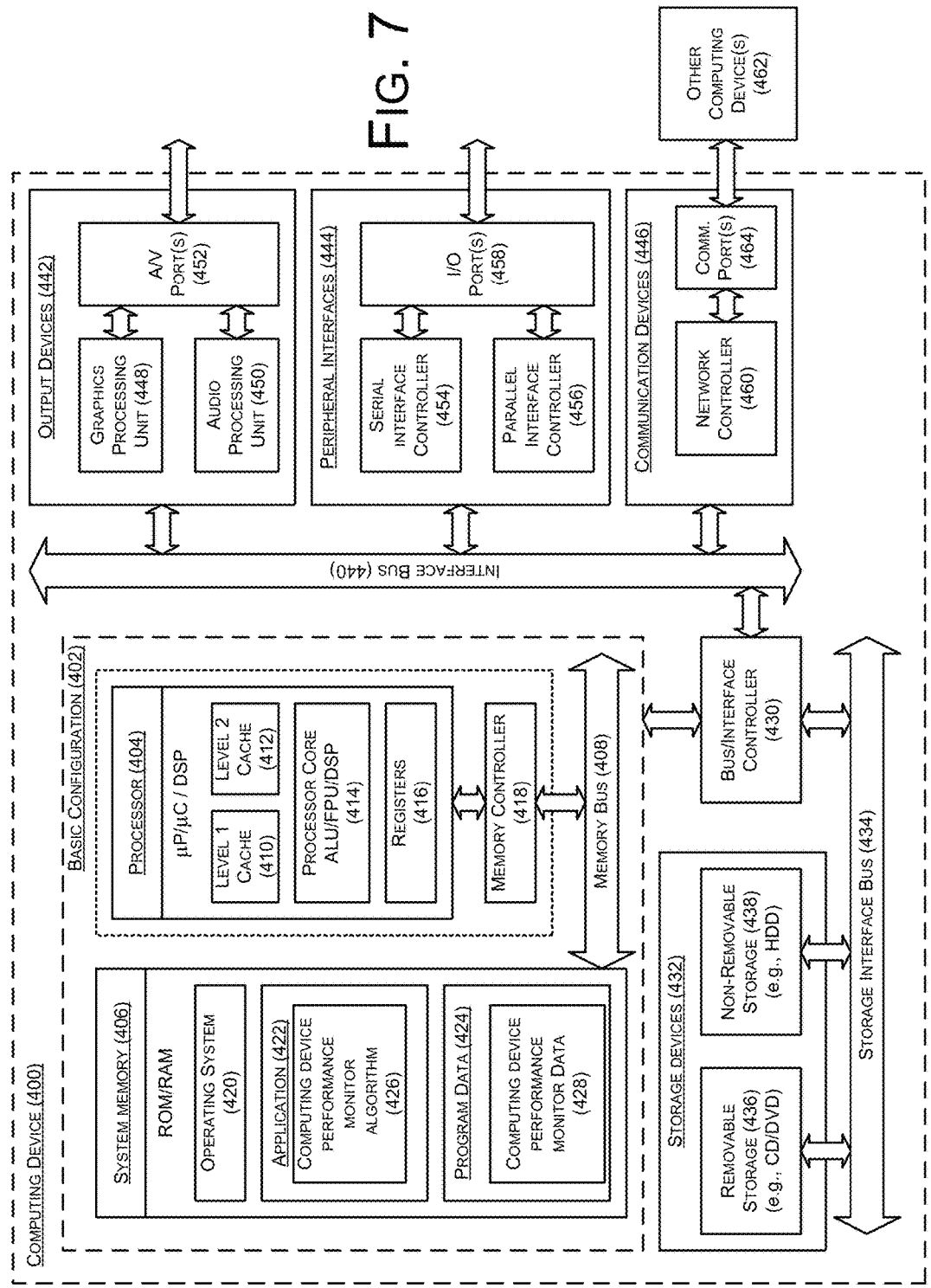

COMPUTING DEVICE PERFORMANCE MONITOR

CROSS-REFERENCE TO RELATED APPLICATION

This application is a U.S. National stage filing under 35 U.S.C. § 371 of International Application No. PCT/US13/39641, filed on May 6, 2013. The disclosure of International Application No. PCT/US13/39641 is hereby incorporated by reference in its entirety.

BACKGROUND

Unless otherwise indicated herein, the materials described in this section are not prior art to the claims in this application and are not admitted to be prior art by inclusion in this section.

In a cloud computing environment, computing resources may be provided as a service to consumers through a network. Consumers may have access to various software and infrastructure provided by the network. A network provider in such a cloud computing environment may agree to a service level agreement (SLA). The SLA may define a level of service to be expected by a consumer. Consumers may configure systems designed to take advantage of services provided by the network in accordance with the SLA.

SUMMARY

In one example, a method for monitoring performance of a computing device is generally described. The method may include receiving a specified counting rate at the computing device. The method may further include counting, at the computing device, at the specified counting rate to generate a sequence of counting numbers. The method may include identifying a first output of a process at the computing device. The method may include identifying a first counting number when the first output is identified at the computing device. The method may include identifying a second output of the process at the computing device. The method may include identifying a second counting number when the second output is identified at the computing device. The method may include determining whether an alert should be generated based on the first and second counting numbers at the computing device.

In one example, a computing device is generally described. The computing device may include a memory with instructions. The computing device may further include a processor configured to be in communication with the memory. The processor may be configured to receive a specified counting rate. The processor may be further configured to count at the specified counting rate to generate a sequence of counting numbers. The processor may be further configured to identify a first output of a process at the computing device. The processor may be further configured to identify a first counting number when the first output is identified at the computing device. The processor may be further configured to identify a second output of the process at the computing device. The processor may be further configured to identify a second counting number when the second output is identified at the computing device. The processor may be further configured to determine whether an alert should be generated based on the first and second counting numbers at the computing device.

In one example, a system effective to monitor performance of one or more computing devices is generally described. The system may include a control device, a network, and a first computing device and a second computing device. The first computing device may be configured to be in communication with the control device over the network. The second computing device may be configured to be in communication with the control device and the first computing device over the network. The control device may be effective to send a specified counting rate to the first and second computing devices. The first computing device may include a first memory with first instructions and a first processor configured to be in communication with the first memory. The first processor may be configured to receive the specified counting rate. The first processor may be further configured to count at the specified counting rate to generate a first sequence of counting numbers. The first processor may be further configured to identify a first output of a process. The first processor may be further configured to identify a first counting number when the first output is identified at the first computing device. The first processor may be further configured to identify a second output of the process at the first computing device. The first processor may be further configured to identify a second counting number when the second output is identified at the first computing device. The first processor may be further configured to determine whether an alert should be generated based on the first and second counting numbers at the first computing device. The second computing device may include a second memory with second instructions and a second processor configured to be in communication with the second memory. The second processor may be configured to receive the specified counting rate and count at the specified counting rate to generate a second sequence of counting numbers.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 6 illustrates computer program products for implementing a computing device performance monitor; and FIG. 7 is a block diagram illustrating an example computing device that is arranged to implement a computing device performance monitor;

Figure 1:
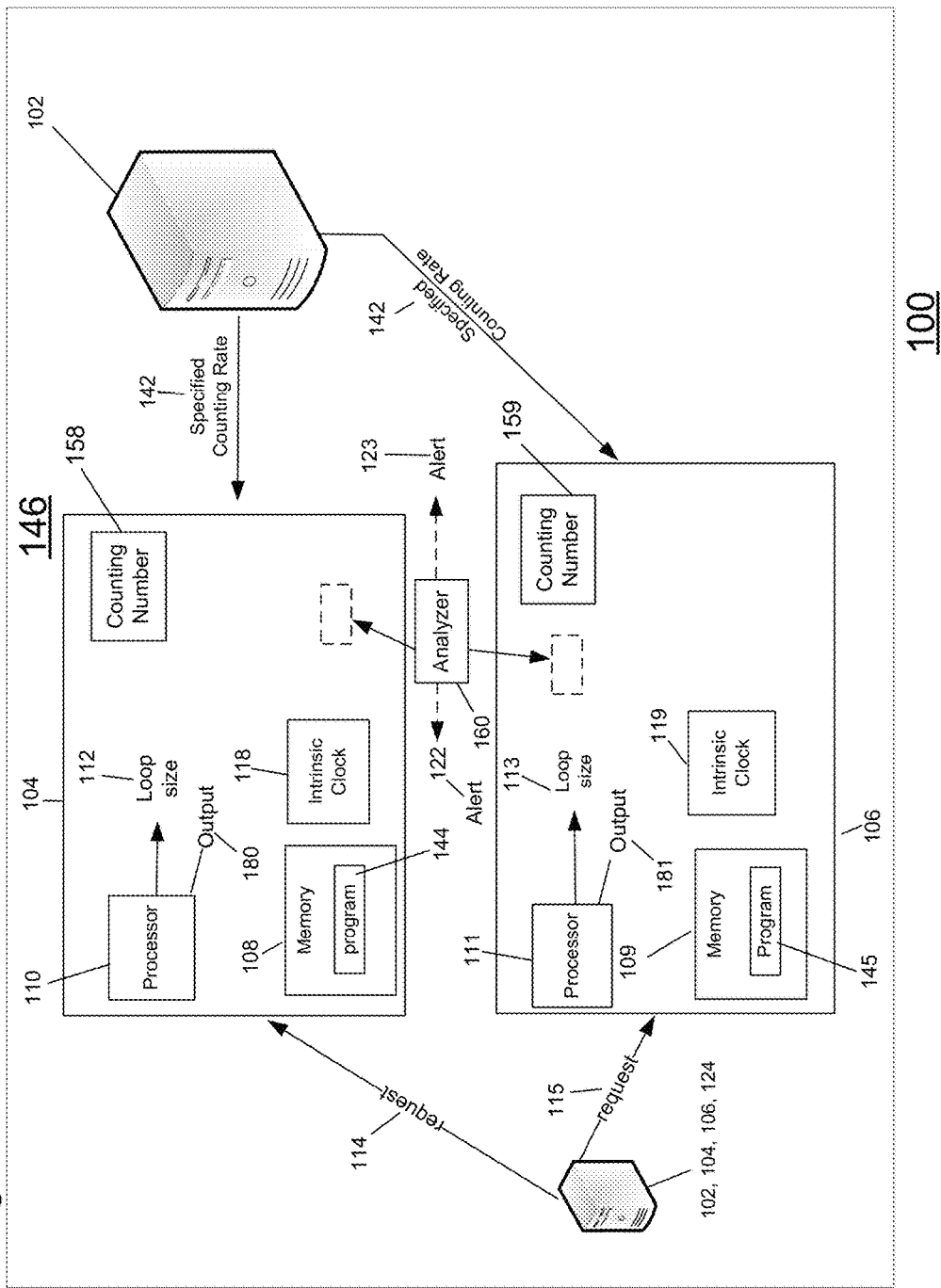
FIG. 1 illustrates some example systems that can be utilized to implement a computing device performance monitor.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a computing device performance monitor.

Briefly stated, technologies are generally described for systems, devices and methods effective to monitor performance of a computing device. A computing device may receive a specified counting rate. The computing device may count at the specified counting rate to generate a sequence of counting numbers. The computing device may identify a first output of a process, such as results from computations performed on data, and may identify a first counting number when the first output is identified. The computing device may identify a second output of the process, such as additional results from the computations, and may identify a second counting number when the second output is identified. The computing device may then determine whether an alert should be generated based on the first and second counting numbers such as when a difference between the first and second counting numbers exceeds a threshold value.

FIG. 1 illustrates some example systems that can be utilized to implement a computing device performance monitor, arranged in accordance with at least some embodiments described herein. As discussed in more detail below, in some examples, a system 100 may include a control device 102, and one or more computing devices 104, and/or 106 configured to be in communication with each other over a network 146. Computing device 104 may include a processor 110, a memory 108, and an intrinsic clock 118. Intrinsic clock 118 may be for example, an oscillating signal of pulses which alternate between relative high and low values. One or more programs 144 may be stored within the memory 108. Computing device 106 may include a processor 111, a memory 109, and an intrinsic clock 119. One or more programs 145 may be stored within the memory 109.

As discussed in more detail below, control device 102 may send a specified counting rate 142 to first and second computing devices 104, 106. Specified counting rate 142 may be selected by control device 102 based on intrinsic clocks 118, 119 and may be one or more orders of magnitude smaller than intrinsic clocks 118, 119. Specified counting rate 142 may identify a process to be performed at a particular rate. The particular rate may have a value that is similar to the data communication rate among devices in system 100 or may be a rate that is tailored to one or more processes to be monitored. In one example, each iteration of the process may increment a count or counting number, as is described in more detail below. The process, in turn, may include repeatedly counting to a particular number so that each iteration of counting to the particular number may increment the count or counting number.

Control device 102 may be any device configured to send specified counting rate 142. Specified counting rate 142 may be, for example, a number and a time interval for a processor to count to that number. For example, specified counting rate 142 may include counting to the number 1,120 in a time interval of 2 ms. Specified counting rate 142 may be changed at any time. Processor 110, based on instructions in program 144, may be configured to receive specified counting rate 142. Based on specified counting rate 142 and intrinsic clock 118, program 144 may calculate a loop size 112. Loop size 112 may reflect a ratio of specified counting rate 142 to a calculated counting rate of intrinsic clock 118.

Loop size 112 may be used by computing device 104 to define a loop. Each iteration of intrinsic clock 118 counting to loop size 112 may increment a counting number 158 by one. Multiple iterations of counting to loop size 112 may generate a sequence of counting numbers 158. In an example, the loop size may be 500. For each iteration of intrinsic clock 118 counting to 500, counting number 158 may be incremented by one. Loop size 112 thus may be used so that computing device 104 counts at specified counting rate 142. Counting number 158 keeps track of a number of times that computing device 104 counts to loop size 112. In another example, intrinsic clock 118 may have a frequency of 48 MHz. Control device 102 may send specified counting rate 142 to count 1024 numbers per 1 second. Processor 110, based on instructions in program 144, may calculate a loop size 112 of 46,875. Computing device 104 may then increment counting number 158 at the specified count rate of 1024 numbers per 1 second.

Similarly, processor 111, based on instructions in program 145 may be configured to receive specified counting rate 142. Based on specified counting rate 142 and intrinsic clock 119, program 145 may calculate loop size 113. Loop size 113 may reflect a ratio of specified counting rate 142 to a counting rate of intrinsic clock 119.

Loop size 113 may be used by computing device 106 to define a loop. Each iteration of intrinsic clock 119 counting to loop size 113 may increment a counting number 159 by one. Multiple iterations of counting to loop size 113 may generate a sequence of counting numbers 159. Loop size 113 thus may be used so that computing device 104 counts at specified counting rate 142. Computing device 104 may begin counting at specified counting rate 142 in response to a start signal. The start signal may be generated by processor 110, processor 111, control device 102 or by another signal generator device. Devices using the start signal may all receive the start signal at the same time or at different times. Counting number 159 keeps track of a number of times that computing device 106 counts to loop size 113. In an example, processor 110 and processor 111 may now count at specified counting rate 142, allowing for scaled comparisons between computing device 104 and computing device 106. Counting numbers 158, 159 may increment at the same rate even in examples where the intrinsic clocks operate at different frequencies. In an example, although computing devices 104, 106 may have different intrinsic clocks 118, 119, counting numbers 158, 159 may both increment every 0.1 μS.

Computing device 104 may then receive a request 114 to process one or more instructions. Request 114 may be issued by computing device 106, control device 102, or another device 124. Pursuant to request 114, one or more instructions may be processed by processor 110 to produce an output 180. After identifying output 180, computing device 104 may identify counting number 158.

Similarly, computing device 106 may receive a request 115 to process one or more instructions. Request 115 may be issued by computing device 104, control device 102, or another device 124. Pursuant to request 115, one or more instructions may be processed by processor 111 to produce an output 181. After identifying output 181, computing device 106 may identify counting number 159.

Processor 110 may identify output 180 and counting number 158. Counting number 158 may be analyzed by analyzer 160. Analyzer 160 may be associated with, for example, computing device 104, 106, control device 102, and/or another device. Additionally, there may be more than one instance of analyzer 160 instantiated within system 100. As described in more detail below, analyzer 160 may be configured to compare two or more counting numbers 158, 159. Analyzer 160 may determine whether an alert 122 should be generated based upon the comparison. Alert 122 may be, by way of example, an email, a text message, an on-screen indicator, or any other manner of alert sent to a user or administrator of system 100.

Similarly, processor 111 may identify output 181 and counting number 159. Output 181 may be analyzed by analyzer 160. As described in more detail below, analyzer 160 may be configured to compare two or more counting numbers. Analyzer 160 may determine whether an alert 123 should be generated based upon the comparison.

Figure 2:
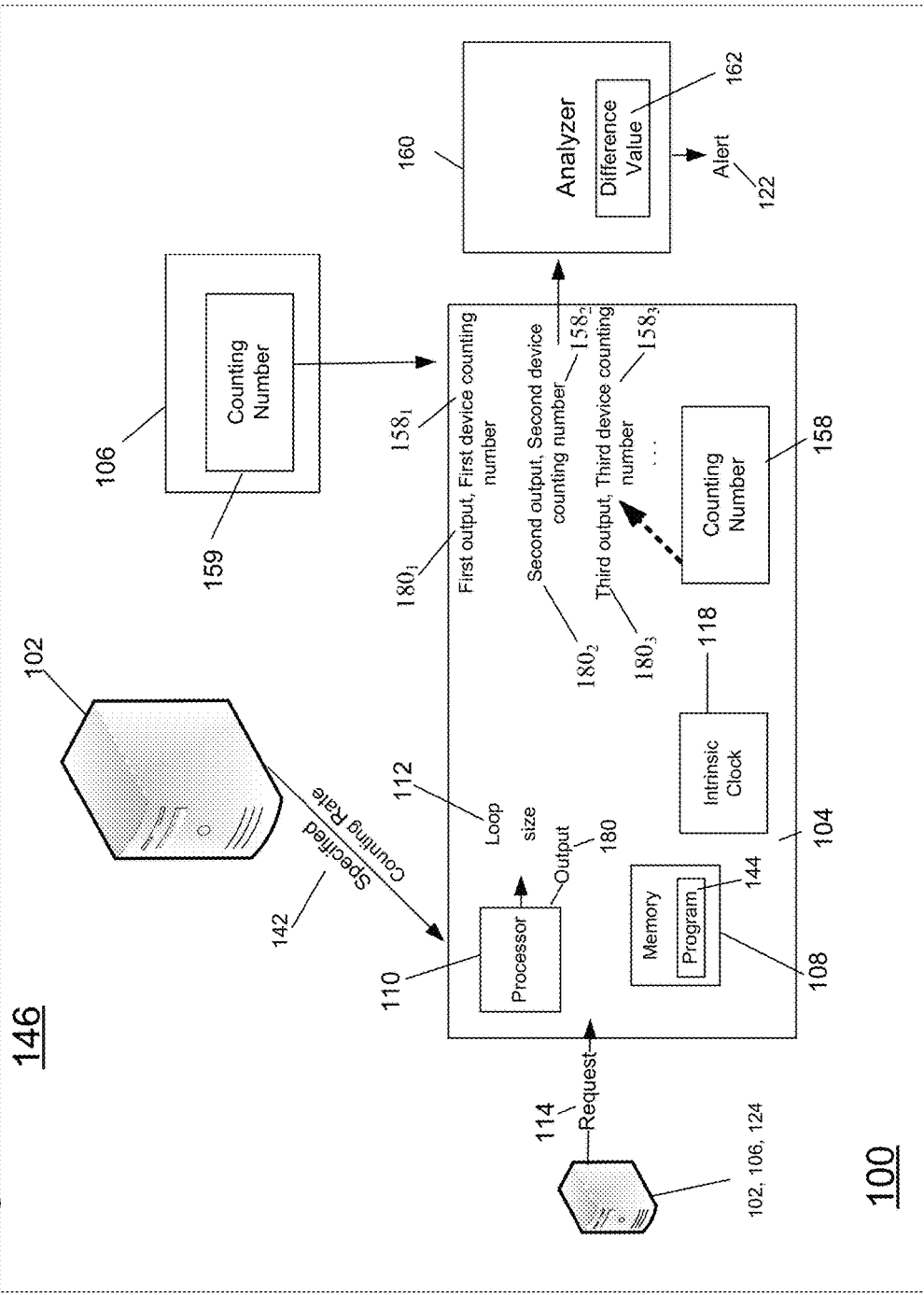
FIG. 2 illustrates some example systems that can be utilized to implement a computing device performance monitor.

FIG. 2 illustrates some example systems that can be utilized to implement a computing device performance monitor, arranged according to at least some embodiments described herein. Those components in FIG. 2 that are labeled identically to components of FIG. 1 will not be described again for the purposes of clarity.

In one example, request to process 114 may be issued by a computing device 106, a control device 102, or another device 124. Pursuant to request 114, one or more instructions may be processed by processor 110 to produce two or more outputs 180 ($180_1$, $180_2$, $180_3$, etc.). When outputs 180 are identified, corresponding counting numbers 158 ($158_1$, $158_2$, $158_3$, etc.) may also be identified. In one example, computing device 104 may add a first counting number $158_1$ as a tag to a first process output $180_1$, a second counting number $158_2$ as a tag to a second process output $180_2$, and a third counting number $158_3$ as a tag to a third process output $180_3$, etc.

Outputs 180 (including $180_1$, $180_2$, $180_3$, etc.), with added counting numbers 158 (including $158_1$, $158_2$, $158_3$, etc.), may then be sent be sent to analyzer 160. Analyzer 160, as mentioned previously, may be associated with control device 102, computing device 104, 106, or another device. Analyzer 160 may be configured to compare counting numbers $158_1$, $158_2$, $158_3$, etc. In one example, analyzer 160 may compare the device counting number added to a most recent output 180 to the device counting number added to a previous process output.

Analyzer 160 may use one or more techniques to compare counting numbers. For example, third counting number $158_3$ (which may be added to third output $180_3$) may be compared to first counting number $158_1$ (which may be added to first output $180_1$). In another example, analyzer 160 may compare counting numbers of sequential process outputs. For example, analyzer 160 may compare second counting number $158_2$ (added to second output $180_2$) to first counting number $158_1$ (added to first output $180_1$).

In another example, analyzer 160 may be configured to compare counting numbers 158 (including $158_1$, $158_2$, $158_3$, etc.) to counting numbers 159 received from computing device 106. In the example, both computing device 104 and computing device 106 are counting at specified counting rate 142. Computing device 104 may receive outputs from computing device 106. Counting numbers of computing device 104 may be added to the outputs of the computing device 106. Upon receipt of the outputs from computing device 106, first computing device 104 may compare counting numbers of computing device 104 with the received counting numbers from the second computing device 106.

In still another example, analyzer 160 may be configured to compare values of counting numbers 158 from computing device 104 identified upon receipt of outputs from computing device 106. In the example, both computing device 104 and computing device 106 are counting at specified counting rate 142. Computing device 104 may receive outputs from computing device 106. Upon receipt of the outputs from computing device 106, computing device 104 may compare a first device counting number $158_1$ identified upon receipt of a first output with a second device counting number $158_2$ identified upon receipt of a second output.

Analyzer 160 may be configured to compare counting numbers 158, 159 irrespective of whether the counting numbers 158, 159 are attached to one or more outputs 180. After comparing counting numbers, analyzer 160 may then be configured to calculate a difference value 162 between the compared counting numbers. In an example, analyzer 160 may receive a first counting number $158_1$=13 and second counting number $158_2$=64. Analyzer 160 may calculate a difference value of 51 (64−13=51).

Difference value 162 may be proportional to a time interval between the identification of the respective counting numbers compared by analyzer 160. In one example, a difference value 162 of 2000 may correspond to a time interval of 5 µ-seconds, while a difference value of 4000 may correspond to a time interval of 10 µ-seconds.

Analyzer 160 may calculate statistics based on changes between two or more difference values 162. By way of example, analyzer 160 may calculate the average difference value 162 over a period of time, and the standard deviation from the average difference value 162. Such statistical analysis may be performed continuously or periodically for each difference value 162 or for a sample of difference values 162.

By way of example, request 114 may be a request to process instructions that may produce outputs 180 "W", "X", "Y" and "Z" at respective counting numbers 158 "45", "100", "160" and "500". In the example, analyzer 160 may compare the second counting number ("100") to the first counting number ("45") to produce a difference value 162 of "55" (i.e. 100−45=55). Analyzer 160 may then compare the third counting number "160" to the second counting number "100" to produce a difference value 162 of "60" (i.e. 160−100=60). Analyzer 160 may then compare the fourth counting number "500" to the third counting number "160" to produce a difference value 162 of "340" (i.e. 500−160=340). In the example, a difference value 162 of "340" may violate a threshold and analyzer 160 may generate alert 122.

Figure 3:
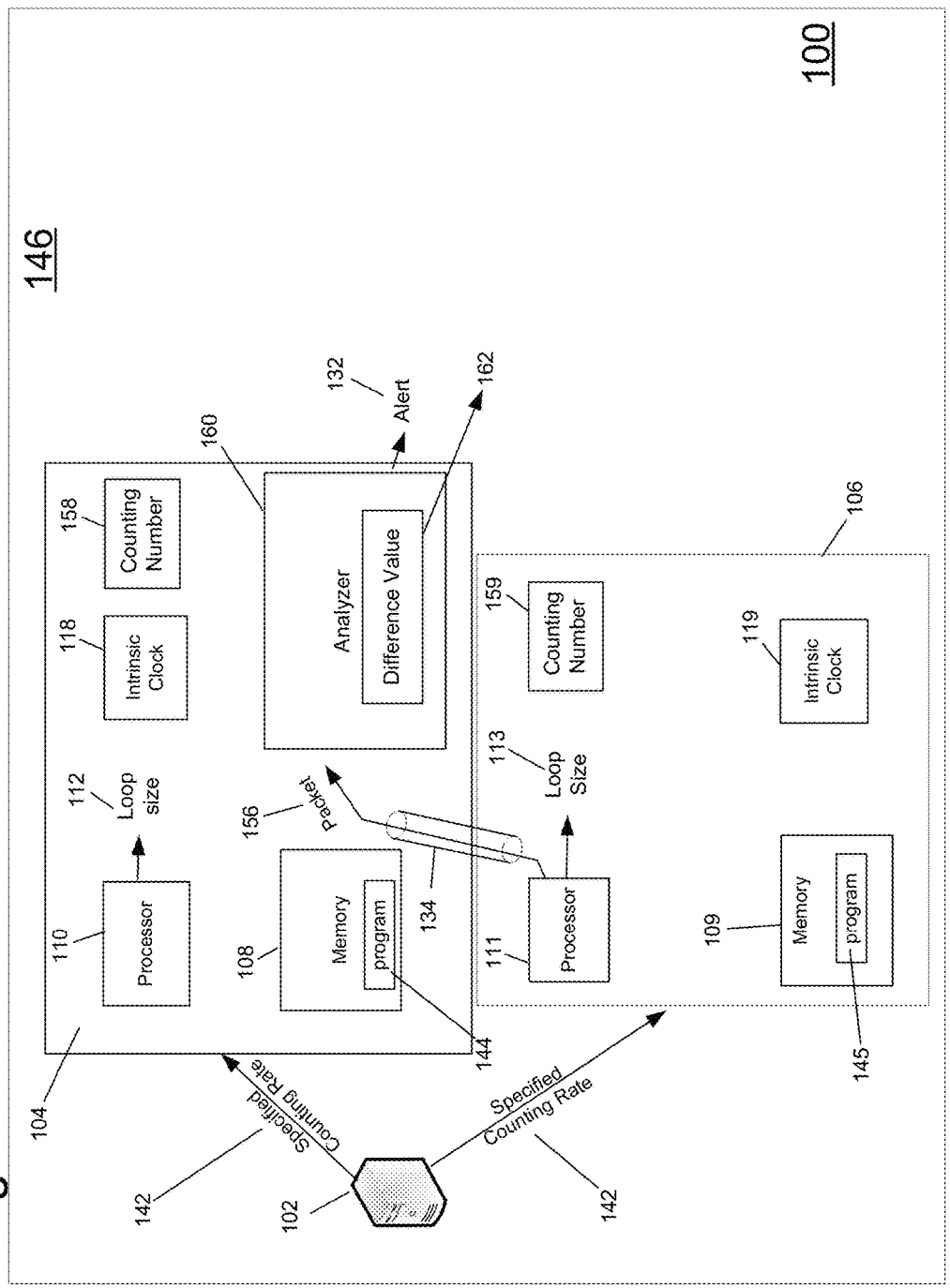
FIG. 3 illustrates some example systems that can be utilized to implement a computing device performance monitor.

FIG. 3 illustrates some example systems that can be utilized to implement a computing device performance monitor, arranged according to at least some embodiments described herein. Those components in FIG. 3 that are labeled identically to components of FIGS. 1 and 2 will not be described again for the purposes of clarity.

In one example, computing device 106 may be connected to computing device 104 through a communication channel 134. Processor 111 may be configured to perform a communication process such as by sending one or more packets 156 through communication channel 134 to computing device 104. Packets 156 may be an output of such a communication process. Output packets from the communication process may be identified by processor 110. As discussed in more detail below, output packets 156 may be used to monitor a performance of the communication process.

In one example, as described in more detail below, analyzer 160 may be configured to compare counting numbers 158, 159. Analyzer 160 may then be configured to generate an alert 132 based upon the comparison. Alert 132 may be, by way of example, an email, a text message, an on-screen indicator, or any other manner of alert sent to a user or administrator of system 100.

Figure 4:
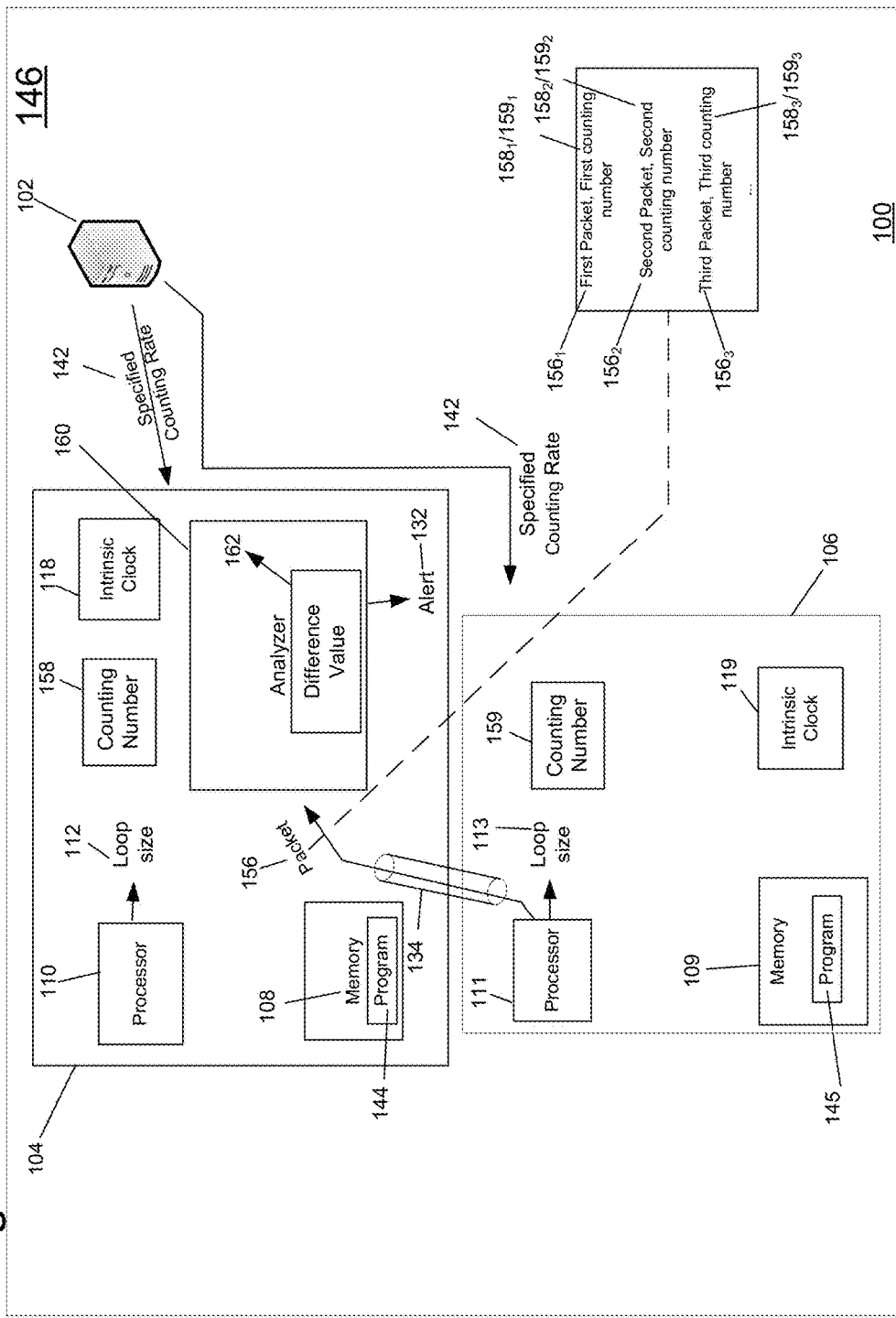
FIG. 4 illustrates some example systems that can be utilized to implement a computing device performance monitor.

FIG. 4 illustrates some example systems that can be utilized to implement a computing device performance monitor, arranged according to at least some embodiments described herein. Those components in FIG. 4 that are labeled identically to components of FIGS. 1, 2 and 3 will not be described again for the purposes of clarity.

In one example, processor 111 may send one or more packets 156 through communication channel 134 to computing device 104. Processor 111 may add a first counting number $159_1$ as a tag to a first packet $156_1$, a second counting number $159_2$ as a tag to a second packet $156_2$, and a third counting number $159_3$ as a tag to a third packet $156_3$, etc. Processor 111 may identify packers 156 and counting numbers 158. In another example, processor 110 of computing device 104 may identify a first counting number $158_1$ upon receipt of first packet $156_1$, identify a second counting number $158_2$ upon receipt of second packet $156_2$, and identify a third counting number $158_3$ upon receipt of third packet $156_3$, etc.

Packets 156 (including $156_1$, $156_2$, $156_3$, etc.) with counting numbers 158, 159 (including $158_1$, $158_2$, $158_3$, $159_1$, $159_2$, $159_3$, etc.) may then be sent be sent to analyzer 160. Analyzer 160, as mentioned previously, may be associated with control device 102, computing device 104, 106, or another device. Analyzer 160 may then be configured to compare counting numbers 158, 159 (including $158_1$, $158_2$, $158_3$, $159_1$, $159_2$, $159_3$, etc.). In one example, analyzer 160 may compare the counting number identified with the most recent packet received to the counting number identified with a previously received packet.

Analyzer 160 may use one or more techniques to compare counting numbers. For example, third counting number $159_3$ (which may be added to third packet $156_3$) may be compared to first counting number $159_1$ (added to first packet $156_1$). In another example, analyzer 160 may compare counting numbers of sequential packets. For example, analyzer 160 may compare second counting number $159_2$ (added to second packet $156_2$) to first counting number $159_1$ (added to first packet $156_1$).

In another example, analyzer 160 may be configured to compare counting numbers 158 (including $158_1$, $158_2$, $158_3$, etc.) to counting numbers 159 received from computing device 106. For example, computing device 104 may receive packets from computing device 106. Counting numbers 159 (including $159_1$, $159_2$, $159_3$, etc.) from computing device 106 may be added to one or more packets 156 sent by computing device 106 to computing device 104. Upon receipt of one or more packets 156, computing device 104 may compare current counting numbers 158 (including $158_1$, $158_2$, $158_3$, etc.) in computing device 104 with received counting numbers 159 (including $159_1$, $159_2$, $159_3$, etc.).

In still another example, analyzer 160 may be configured to compare values of counting numbers 158 from computing device 104 identified upon receipt of packets from computing device 106. For example, computing device 104 may receive output packets from computing device 106. Upon receipt of the output packets from computing device 106, computing device 104 may compare a first device counting number identified upon receipt of a first packet (e.g. $158_1$) with a second device counting number identified upon receipt of a second packet (e.g. $158_2$).

Analyzer 160 may be configured to compare counting numbers 158, 159 irrespective of whether the counting numbers 158, 159 are attached to one or more packets 156. After comparing counting numbers, analyzer 160 may then be configured to calculate a difference value 162 between the compared counting numbers. Difference value 162 may be proportional to a time interval between the identification of the respective counting numbers compared by analyzer 160.

Analyzer 160 may then calculate statistics based on changes between two or more difference values 162. By way of example, analyzer 160 may calculate the average difference value 162 over a period of time, and the standard deviation from the average difference value 162. Such statistical analysis may be performed continuously or periodically for each difference value 162 or for a sample of difference values 162.

As mentioned previously, analyzer 160 may generate an alert 132. Alert 132 may be, by way of example, an email, a text message, an on-screen indicator, or any other manner of alert sent to a user or administrator of system 100. Such an alert may be in response to statistics calculated based on difference values 162. Alert 132 may also be in response to difference values exceeding a threshold value. For example, if difference values 162, averages, or a standard deviation which violate a threshold value, alert 132 may be generated. In an example, analyzer 160 may detect ten difference values of 107, 113, 99, 104, 103, 121, 94, 105, 101, and 98. These values have a mean of 104.5 and a standard deviation of 7.80669. A threshold standard deviation may be 10.00000. If subsequent difference values 162 cause the standard deviation to rise above 10.00000, alert 132 may be generated.

A threshold value may be, for example, a number which difference values 162 should not exceed and/or a number which difference values 162 should not fall below. In an example, any computing device associated with system 100 may continually calculate a mean difference value 162 and standard deviation. When the mean difference values do not change by more than a certain predefined tolerance (e.g. 10%), then the current calculated difference values 162 may be used as the threshold value.

Difference values 162 may or may not be associated with a particular task. A task may be, for example, a thread process, communication transformation, packet transmission, memory writing or reading, etc. In an example, a difference value 162 associated with a particular task that exceeds a threshold value may indicate a change in task execution time. In another example, a difference value 162, not associated with a particular task, that exceeds a threshold value, may indicate that the intrinsic clock of the computing device has become slower. In an example, a difference value 162 that exceeds a relatively high threshold value may indicate that one or more of the computing devices associated with difference value 162 does not count at specified counting rate 142.

Analyzer 160 may determine that a particular device is in danger of dropping below a level of service required by an SLA (service level agreement) based on difference values 162 related to the device. Analyzer 160 may then generate alert 132 which may specify the potentially malfunctioning device, provide statistics related to the device's performance, and/or suggest a course of remedial action.

Among other potential benefits, a system in accordance with the disclosure may allow users to detect performance degradation of computing devices in communication over a network. Performance degradation may include hardware device failure or degradation, software failure or performance degradation (e.g., garbage collection malfunction, buffer overflows, etc.), operational activity degradation due to process load, and/or process degradation due to unauthorized activity. In a cloud computing environment, a user of a system in accordance with the disclosure may be able to pinpoint a particular device which is having performance issues. Additionally, a user may be able to identify the cause of a performance degradation based on statistics calculated from changing difference values. Computing devices may be monitored without requiring each device to be synchronized with a centralized clock.

Service providers may implement a system in accordance with the disclosure to have a better sense on performance and to leverage resources as needed. Data centers may implement the disclosed system to better control software and prevent failures. Application providers may used the described system to ensure a service level. A user may implement the system to ensure that they receive their requested performance.

Figure 5:
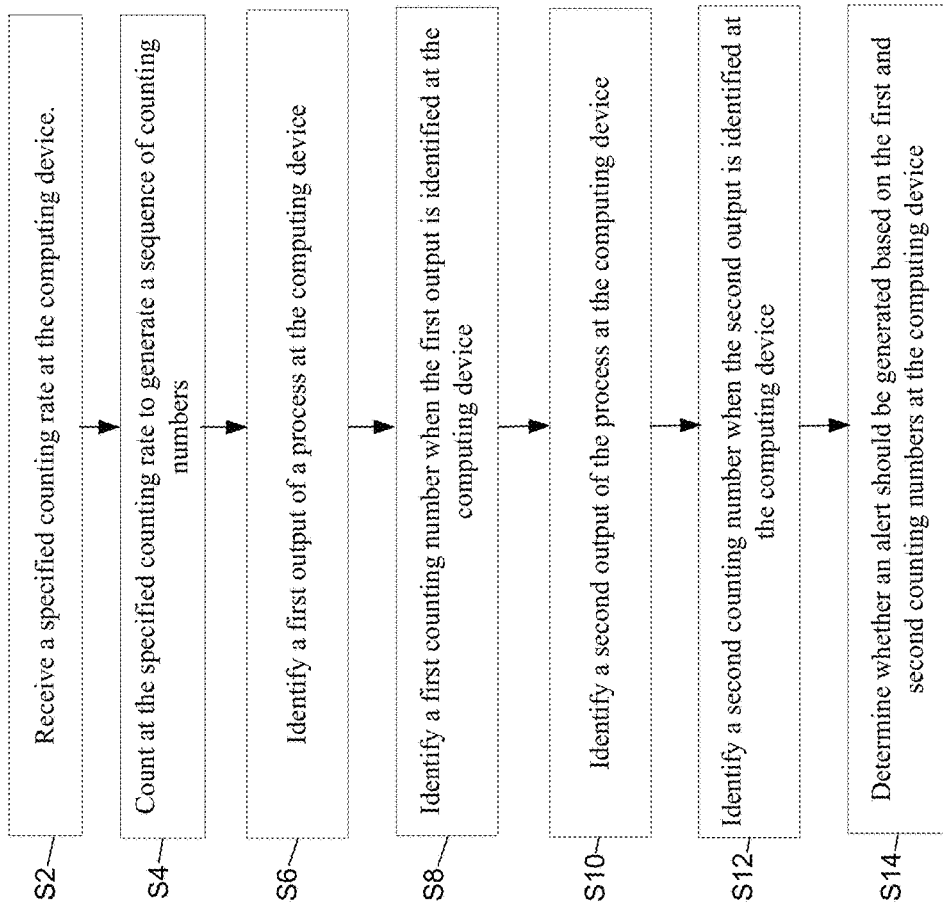
FIG. 5 depicts a flow diagram for example processes for implementing a computing device performance monitor.

FIG. 5 depicts a flow diagram for example processes for implementing a computing device performance monitor, arranged in accordance with at least some embodiments described herein. The process in FIG. 5 could be implemented using, for example, system 100 discussed above and could be used to monitor performance of a computing device. An example process may include one or more operations, actions, or functions as illustrated by one or more of blocks S2, S4, S6, S8, S10, S12 and/or S14. Although illustrated as discrete blocks, various blocks may be divided into additional blocks, combined into fewer blocks, or eliminated, depending on the desired implementation.

Processing may begin at block S2, "Receive a specified counting rate at the computing device." At block S2, a computing device may receive a specified counting rate.

Processing may continue from block S2 to block S4, "Count at the specified counting rate to generate a sequence of counting numbers." At block S4, a processor of the computing device may count at the specified counting rate to generate a sequence of counting numbers. In an example, counting at the specified counting rate to generate a sequence of counting numbers may include calculating a loop size for the computing device, where the loop size is based on the specified counting rate and a clock rate of the computing device. Counting at the specified counting rate to generate a sequence of counting numbers may further include incrementing the counting number each time the computing device counts through a loop of a size equal to the loop size.

Processing may continue from block S4 to block S6, "Identify a first output of a process at the computing device." In an example, the first output may be an output from processing one or more instructions at the computing device. In another example, the first output may be one or more packets received through a communication channel, where the communication channel is between the computing device and another computing device.

Processing may continue from block S6 to block S8, "Identify a first counting number when the first output is identified at the computing device." At block S8, a first counting number may be identified when the first output is identified at the computing device.

Processing may continue from block S8 to block S10, "Identify a second output of the process at the computing device." In an example, the second output may be an output from processing one or more instructions at the computing device. In another example, the second output may be one or more packets received through a communication channel, where the communication channel is between the computing device and another computing device.

Processing may continue from block S10 to block S12, "Identify a second counting number when the second output is identified at the computing device." At block S12, a second counting number may be identified when the second output is identified at the computing device.

Processing may continue from block S12 to block S14, "Determine whether an alert should be generated based on the first and second counting numbers at the computing device." At block S14, a determination may be made whether to generate an alert based on the first and second counting numbers at the computing device. The determination may include calculating at least one difference value by comparing respective first counting numbers with respective second counting numbers where the second counting numbers may be received from another computing device. The determination may include calculating changes between two or more difference values. The determination may include calculating one or more statistics based on the changes between two or more difference values. In some examples, the determination may be based on whether at least one of the statistics or difference values exceeds a threshold value.

FIG. 6 illustrates computer program products 300 for implementing a computing device performance monitor, arranged in accordance at least some embodiments described herein. Program product 300 may include a signal bearing medium 302. Signal bearing medium 302 may include one or more instructions 304 that, when executed by, for example, a processor, may provide the functionality described above with respect to FIGS. 1-5. Thus, for example, referring to system 100, computing device 104 or computing device 106 may undertake one or more of the blocks shown in FIG. 6 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 7 is a block diagram illustrating an example computing device 400 that is arranged to implement a computing device performance monitor, arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a computing device performance monitor algorithm 426 that is arranged to perform the functions as described herein including those described previously with respect to FIGS. 1-6. Program data 424 may include computing device performance monitor data 428 that may be useful for implementing a computing device performance monitor as is described herein. In some embodiments, application 422 may be arranged to operate with program data 424 on operating system 420 such that a computing device performance monitor may be provided. This described basic configuration 402 is illustrated in FIG. 7 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to monitor performance of a computing device over a network, the method comprising:
    receiving, at the computing device, a specified counting rate over the network from a control device, wherein the specified counting rate identifies a counting process to be performed at a particular rate by the computing device, and wherein the specified counting rate includes a number and a time interval to count to the number;
    calculating a loop size for the computing device based on the specified counting rate and a clock rate of the computing device;
    incrementing a specific counting number by one for each iteration of the computing device counting to the loop size to generate a sequence of counting numbers for multiple iterations of the computing device counting to the loop size;
    identifying a first output of a monitored process at the computing device;
    identifying a first counting number in the sequence of counting numbers in response to the identification of the first output at the computing device;
    identifying a second output of the monitored process at the computing device;
    identifying a second counting number in the sequence of counting numbers in response to the identification of the second output at the computing device;
    determining whether an alert should be generated based on the first counting number and the second counting number;
    generating the alert in response to a determination that the alert should be generated, wherein generating the alert comprises generating an alert that is indicative of degradation in the performance of the computing device; and
    sending, by the control device, the generated alert over the network to a user of the computing device to enable the user to take a remedial action for the computing device.

2. The method of claim 1, wherein the first and second outputs are outputs from processing one or more instructions at the computing device.

3. The method of claim 1, wherein the first and second outputs are packets received through a communication channel, and wherein the communication channel is between the computing device and another computing device.

4. The method of claim 1, wherein determining whether an alert should be generated comprises:
    calculating two or more difference values by comparing respective first counting numbers with respective second counting numbers;
    calculating changes between the two or more difference values;
    calculating one or more statistics based on the changes between the two or more difference values; and determining whether at least one of the one or more statistics or the two or more difference values exceed a threshold value.

5. The method of claim 1, wherein the second counting number is received from another computing device.

6. The method of claim 1, wherein:
the second counting number is received from another computing device; and
determining whether an alert should be generated comprises:
calculating two or more difference values by comparing respective first counting numbers with respective second counting numbers;
calculating changes between the two or more difference values;
calculating one or more statistics based on the changes between the two or more difference values; and
determining whether at least one of the one or more statistics or the two or more difference values exceed a threshold value.

7. A computing device comprising:
a memory with instructions;
a processor configured to be in communication with the memory and to execute the instructions to perform or control performance of operations to:
receive, at the computing device, a specified counting rate over a network from a control device, wherein the specified counting rate identifies counting process to be performed at a particular rate, and wherein the specified counting rate includes a number and a time interval to count to the number;
calculate a loop size based on the specified counting rate and a clock rate of the computing device;
increment a specific counting number by one for each iteration of a count to the loop size to generate a sequence of counting numbers for multiple iterations of the count to the loop size;
identify a first output of a monitored process at the computing device;
identify a first counting number in the sequence of counting numbers in response to the identification of the first output at the computing device;
identify a second output of the monitored process at the computing device;
identify a second counting number in the sequence of counting numbers in response to the identification of the second output at the computing device;
determine whether an alert should be generated based on the first counting number and the second counting number;
generate the alert in response to a determination that the alert should be generated, wherein the generated alert includes one of an email, a text message, and on-screen indicator, and wherein the generated alert indicates degradation in the performance of the computing device; and
send, by the control device, the generated alert over the network to a user of the computing device to facilitate a remedial action that pertains to the performance of the computing device.

8. The computing device of claim 7, wherein the first and second outputs are outputs from processing one or more instructions at the computing device.

9. The computing device of claim 7, wherein the first and second outputs are packets received through a communication channel, and wherein the communication channel is between the computing device and another computing device.

10. The computing device of claim 7, wherein to determine whether the alert should be generated, the processor is configured to:
calculate two or more difference values by comparison of respective first counting numbers with respective second counting numbers;
calculate changes between the two or more difference values;
calculate one or more statistics based on the changes between the two or more difference values; and
determine whether at least one of the one or more statistics or the two or more difference values exceed a threshold value.

11. The computing device of claim 7, wherein the second counting number is received from another computing device.

12. The computing device of claim 7, wherein:
the second counting number is received from another computing device; and
to determine whether the alert should be generated, the processor is configured to:
calculate two or more difference values by comparison of respective first counting numbers with respective second counting numbers;
calculate changes between the two or more difference values;
calculate one or more statistics based on the changes between the two or more difference values; and
determine whether at least one of the one or more statistics or the two or more difference values exceed a threshold value.

13. A system effective to monitor performance of one or more computing devices over a network, the system comprising:
a control device;
a network;
a first computing device configured to be in communication with the control device over the network; and
a second computing device configured to be in communication with the control device and the first computing device over the network, wherein:
the control device is effective to send a specified counting rate to the first and second computing devices, wherein the specified counting rate identifies a counting process to be performed at a particular rate by the first and second computing devices, and wherein the specified counting rate includes a number and a time interval to count to the number;
the first computing device comprises:
a first memory with first instructions; and
a first processor configured to be in communication with the first memory and to execute the first instructions to perform or control performance of operations to:
receive, at the first computing device, the specified counting rate over the network;
calculate a loop size based on the specified counting rate and a first clock rate of the first computing device;
increment a specific counting number by one for each iteration of a count to the loop size to generate a first sequence of counting numbers for multiple iterations of the count to the loop size;
identify a first output of a monitored process;

identify a first counting number in the first sequence of counting numbers in response to the identification of the first output at the first computing device;

identify a second output of the monitored process at the first computing device;

identify a second counting number in the first sequence of counting numbers in response to the identification of the second output at the first computing device;

determine whether to generate an alert based on the first counting number and the second counting number;

generate the alert in response to a determination that the alert should be generated, wherein the alert indicates a degradation in performance of the first computing device; and send, by the control device, the generated alert over the network to a user of the first computing device, wherein the generated alert facilitates a remedial action, by the user, for the first computing device; and the second computing device comprises:
a second memory with second instructions; and
a second processor configured to be in communication with the second memory and to execute the second instructions to perform or control performance of operation to:
receive, at the second computing device, the specified counting rate over the network; and
perform the counting process at the specified counting rate to generate a second sequence of counting numbers.

14. The system of claim 13, wherein to determine whether to generate the alert, the first processor is configured to:
calculate two or more difference values by comparison of respective first counting numbers in the first sequence of counting numbers with at least a second counting number in the first sequence of counting numbers;
calculate changes between the two or more difference values;
calculate one or more statistics based on the changes between the two or more difference values; and
determine whether at least one of the one or more statistics or the two or more difference values exceed a threshold value.

15. The system of claim 13, wherein to determine whether to generate the alert, the first processor is configured to:
calculate at least one difference value by comparison of at least a first counting number in the first sequence of counting numbers with at least a second counting number in the second sequence of counting numbers;
calculate one or more statistics based on changes between the at least one difference value; and
determine whether at least one of the one or more statistics or at least one difference value exceed a threshold value.

16. The system of claim 13, wherein to determine whether to generate the alert, the first processor is configured to:
calculate at least one difference value by comparison of at least a first counting number in the second sequence of counting numbers with at least a second counting number in the second sequence of counting numbers;
calculate one or more statistics based on changes between the at least one difference values; and
determine whether at least one of the one or more statistics or at least one difference value exceed a threshold value.

17. The system of claim 13, wherein the first and second outputs are packets received through a communication channel, and wherein the communication channel is between the first computing device and another computing device.

18. The system of claim 13, wherein:
the first processor has the first clock rate with a first frequency; and
the second processor has a second clock rate with a second frequency different from the first frequency.

* * * * *